June 12, 1934.    J. W. ASH    1,962,110
FLOWER HOLDER
Filed Aug. 25, 1931
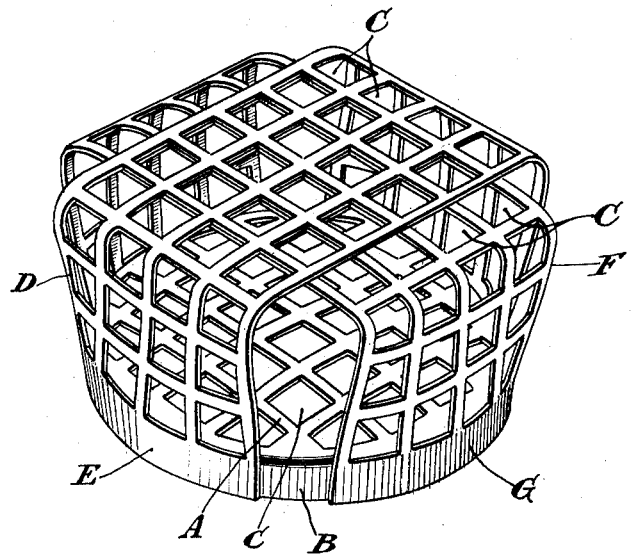
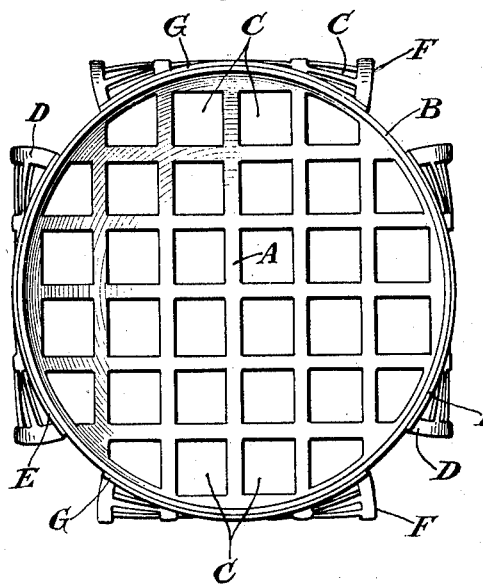
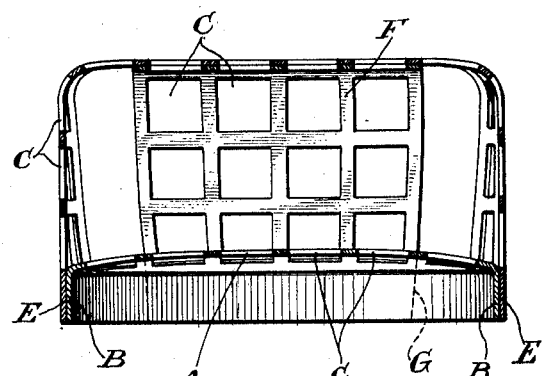
INVENTOR
James W. Ash
BY
ATTORNEY Patented June 12, 1934

1,962,110

UNITED STATES PATENT OFFICE 1,962,110

FLOWER HOLDER

James W. Ash, Middletown, Ohio

Application August 25, 1931, Serial No. 559,265

7 Claims. (Cl. 47—41)

My invention relates to flower holders and is particularly adapted for use as a flower holder to be placed in the bottom of a receptacle containing water, although it may be used without such receptacle or water.

In the drawing Fig. 1 is a perspective view of a flower holder; Fig. 2 is a sectional view through the center thereof, and Fig. 3 a plan view looking upward from the bottom of Fig. 1.

In the drawing in which like characters refer to like parts, A is the base plate which may be either circular as shown or any other desired shape, and is provided with a downwardly extending flange B forming a stand for the flower holder. This base plate A is preferably convex with respect to the base upon which it is stood, and consists of a metal plate having rectangular or other formed portions C removed so as to form openings through which the stems of the flowers may pass. A second plate D is provided having like openings C. This plate D is oblong having its ends E without perforations and is bent, as shown in Fig. 2, so that the unperforated portions E are adjacent to and in contact with the flange B of the plate A, and are fixedly secured to the flange B by spot welding, by solder or otherwise. A third plate F is provided which is of the same character, form and shape as plate B. This plate F arranged at an angle of ninety degrees to the plate D, is bent in the same way that the plate D is bent so as to form downwardly extending portions, the ends G of which are not perforated and have no cut out portion corresponding to the cut out portion C which, in the plate F, are of the same character and shape as the cut out portion C in the plate D. The lower ends G of the plate F are likewise fixedly secured to the flange B of the plate A by spot welding, solder or otherwise. Where the plates D and F cross, as shown in Fig. 1, I spot weld them in one or two places so as to hold them securely together.

The plates D and F with a cross are arranged so that the opening C in the plates register with each other. By bending the plates transversely in a straight line longitudinally of their length, and then curving the unperforated portions at their ends so as to register with the flange B, an ornamental or crown appearance is given to the holder as shown in Fig. 1.

I claim:

1. A flower holder composed of a foraminous base plate having integral therewith a downwardly extending continuous flange forming a stand, a second foraminous plate provided with downwardly extending ends overlapping and fixedly attached to the outer surface of said flange so as to hold a portion of said second plate spaced apart from said first plate.

2. A flower holder composed of a foraminous base plate having a downwardly extending flange, a second foraminous plate provided with downwardly extending ends fixedly attached to said flange so as to hold a portion of said second plate spaced apart from said first plate, and a third plate similar to said second plate arranged at an angle to said second plate.

3. A flower holder composed of a foraminous base plate having a downwardly extending flange, a second foraminous plate provided with downwardly extending ends fixedly attached to said flange so as to hold a portion of said second plate spaced apart from said first plate, and a third plate similar to said second plate arranged at an angle to said second plate and fixedly secured to said second plate and to said flange.

4. A flower holder composed of a foraminous base plate having a downwardly extending flange, a second foraminous plate provided with downwardly extending ends fixedly attached to said flange so as to hold a portion of said second plate spaced apart from said first plate, and a third plate similar to said second plate arranged at an angle to said second plate so that the openings register in said two plates where the plates are in contact.

5. A flower holder composed of a foraminous base plate having a downwardly extending flange, a second foraminous plate provided with downwardly extending ends fixedly attached to said flange so as to hold a portion of said second plate spaced apart from said first plate, and a third plate similar to said second plate arranged at an angle to said second plate and fixedly secured to said second plate and to said flange so that the openings register in said two plates where the plates are in contact.

6. In a flower holder a foraminous base plate having integral therewith a continuous flange forming a stand for said flower holder, a foraminous plate spaced apart from said base plate, said last mentioned plate provided with downwardly extending members having nonforaminous portions on their extreme ends, said ends overlapping and being fixedly secured to the outer surface of the flange of the base plate.

7. In a flower holder a foraminous base plate having integral therewith a downwardly extending flange forming a base for the holder and adapted to space the foraminous portion of the base plate away from whatever article the flower holder is placed upon, a second foraminous plate having a portion spaced apart and above the foraminous portion of the base plate, said second plate having a plurality of downwardly extending flanges forming independent legs for the central portion of said second plate, the lower portion of said flange legs being fixedly secured to the outer surface of the flange of the base plate.

JAMES W. ASH.